United States Patent [19]

DeHaai

[11] 4,000,871
[45] Jan. 4, 1977

[54] AIRPLANE FUSELAGE STRUCTURE

[76] Inventor: Kermit M. DeHaai, R.R. No. 1, Monroe, Iowa 50170

[22] Filed: July 31, 1975

[21] Appl. No.: 600,736

[52] U.S. Cl. .............................. 244/119; 244/108
[51] Int. Cl.² .................................... B64C 1/08
[58] Field of Search .............. 244/119, 120, 117 R, 244/106, 108, 105; 46/74 A, 76 R; D12/71; 114/62

[56] References Cited

UNITED STATES PATENTS

| | | | |
|---|---|---|---|
| 1,727,394 | 9/1929 | Carns | 244/119 |
| 1,754,733 | 4/1930 | Yohe | 244/119 |
| 3,473,761 | 10/1969 | Chutter | 244/119 |

*Primary Examiner*—Trygve M. Blix
*Assistant Examiner*—Barry L. Kelmachter
*Attorney, Agent, or Firm*—Henderson, Strom & Sturm

[57] ABSTRACT

An airplane fuselage of a type having a concave bottom for providing more lift and control at low speeds and with two strut members extending along and on each side of the concave bottom for providing skids for the purpose of emergency landings. The two bottom strut members are connected at the forward end thereof but are spaced apart at the rear end thereof to prevent an aircraft from turning to one side or the other due to direct contact with the ground or a body of water. A top and central strut member is also provided on the fuselage. Relatively short wings are attached to the fuselage portion, all parts of which are located above the two lower strut members. The landing gear is located in the wing structure.

12 Claims, 4 Drawing Figures

U.S. Patent      Jan. 4, 1977      4,000,871
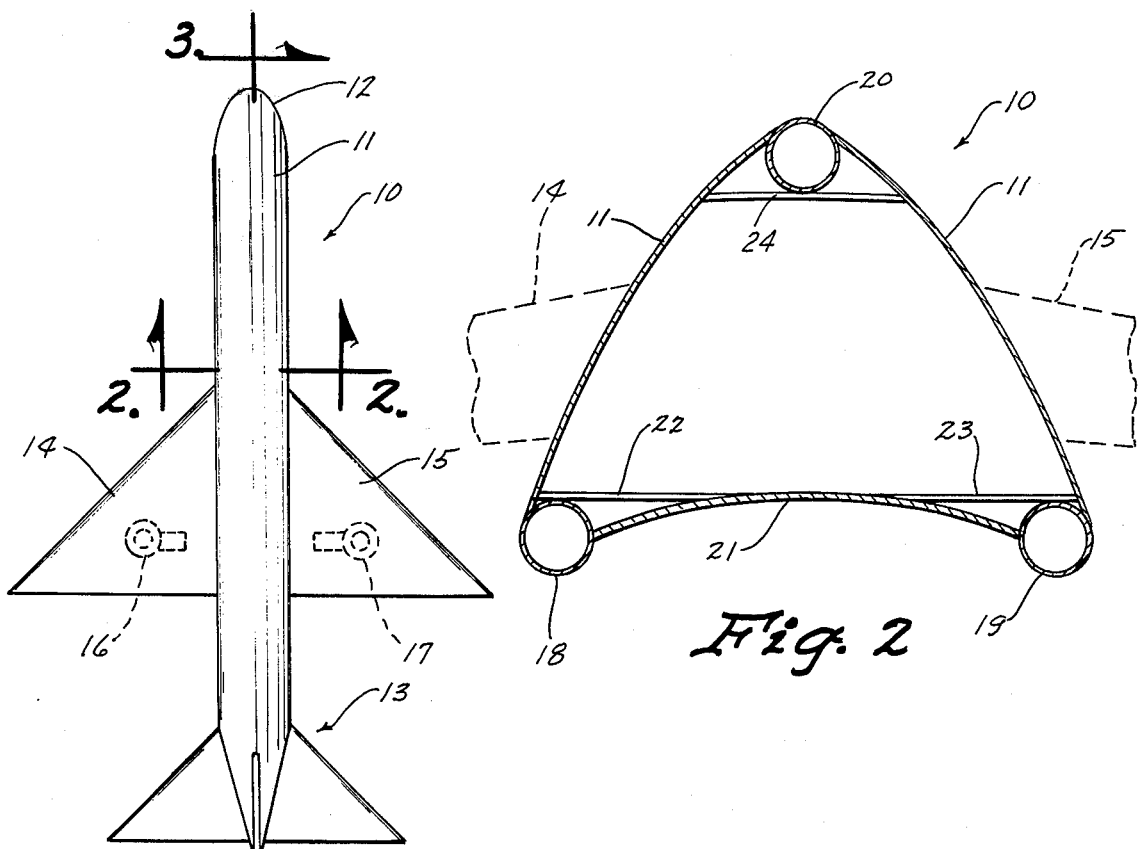
Fig. 1
Fig. 2
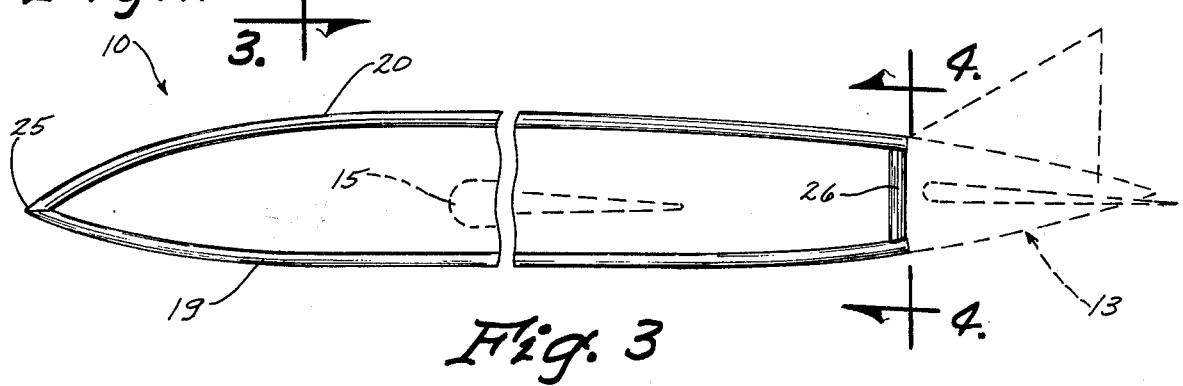
Fig. 3
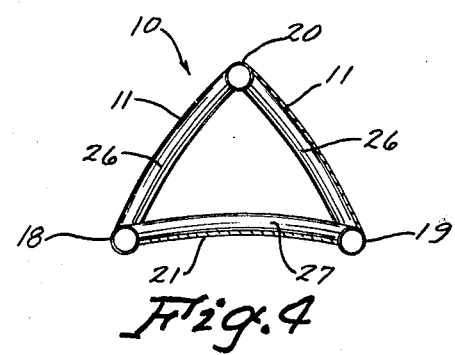
Fig. 4

AIRPLANE FUSELAGE STRUCTURE

BACKGROUND OF THE INVENTION

The present invention relates generally to aircraft structures and more particularly to an aircraft structure which is designed to provide added safety for emergency landing situations.

Most airplane fuselage structures have rounded bottom portions. These aircraft fuselage structures tend to be somewhat elliptical or circular in cross-sectional shape. By utilizing such a structure, much usable space is provided. One of the problems with such a design, however, is that if the landing gear fails to function properly, such structure is not ideally suited for emergency landing situations.

Should the landing gear in a typical conventional airplane get jammed so that the landing gear will not lower into its proper landing position, and an airplane must make an emergency landing, the airplane will normally still try to land with its nose slightly up with respect to the tail as in a normal landing. Once the rounded bottom of such conventional airplane strikes the ground, it will tend to immediately tear it up and furthermore, the plane will tend to rock to one side or the other because it is supported on only one point or line. Once the plane has rocked to one side or the other, one of the wings is likely to hit the ground and cause the plane to spin around. Such spinning is likely to cause more damage to the wing and the bottom of the fuselage and may even cause more problems and destruction should the plane flip over. Actually, it is impossible to predict what a conventional plane would do under such emergency circumstances, but it is clear that the bottom thereof is very likely to be torn up and that the wings will almost certainly suffer some damage too. As the physical damage to the airplane increases, so does the likelihood of injury to the passengers or the crew.

In such an emergency landing over a large body of water, similar problems exist. A typical conventional aircraft still has the problem of being supported only along one line or point along the bottom of the fuselage and still has a tremendous tendency to turn to one side or the other because of the unstability of this situation.

It can therefore be seen that there is a need for an aircraft structure which will not tend to flip over or tear up on the bottom of the fuselage under emergency landing situations.

SUMMARY OF THE INVENTION

The present invention relates to an aircraft fuselage design having a concave bottom for providing more lift and control at low air speeds and having tubular shaped skid members extending along each side of such concave bottom from the front of the fuselage and terminating forwardly of the rear of the aircraft, and being spaced apart at the rear ends thereof. The wings attached to the fuselage are designed to be short to prevent tipping and are also located substantially above the skids to prevent them from touching the ground or water during emergency landing situations.

An object of the present invention is to provide an aircraft structure which is safe for emergency landing situations.

Another object of the present invention is to provide an aircraft structure which will be supported along two skids under an emergency landing situation.

Still another object of the present invention is to provide an aircraft structure wherein skids are provided and such skids are designed also to provide floatation should such aircraft be forced to land on water.

A still further object is to provide an aircraft structure which will provide a high degree of lift and control at low air speeds, especially at take-off and landing speeds.

Other objects, advantages, and novel features of the present invention will become apparent in the following detailed description of the invention when considered in conjunction with the accompanying drawings.

BRIEF DESCRIPTION OF THE DRAWINGS

FIG. 1 is a top plane view of an aircraft constructed according to the present invention;

FIG. 2 is a partial cross-sectional view of this embodiment of the present invention taken along line 2—2 of FIG. 1;

FIG. 3 is a simplified view of the present invention taken generally in cross-section along line 3—3 of FIG. 1 and showing the strut or skid members of the present invention; and FIG. 4 is a partial cross-sectional view taken along line 4—4 of FIG. 3.

DETAILED DESCRIPTION OF THE DRAWINGS

Referring now to the drawings, wherein like reference numerals designate identical or corresponding parts throughout the several views. FIG. 1 shows an airplane body 10 constructed according to the present invention. A fuselage 11 is the main body structure and this fuselage 11 has a nose portion 12 on the front end thereof and a tail portion 13 on the rear end thereof. Wings 14 and 15 extend from the sides thereof and these wings 14 and 15 have landing gear assemblies 16 and 17 respectively attached thereto and retractable therein, as is well known.

Referring to FIG. 2 it can be seen that the fuselage 11 is constructed around three tubular strut members 18, 19 and 20. These strut members are positioned so as to form essentially an isosceles triangle and preferrably an equilateral triangle relationship if the axis of these strut members are considered to be the corners of such triangles. This relationship is preferred along a considerable length of the fuselage 11.

The lower wall 21 of the fuselage 11 is concave about its entire length, the importance of which will be discussed below. It is also noted that the lower concave wall 21 of the fuselage 11 is attached to the first and second strut members 18 and 19 respectively well above the lower part thereof (FIG. 2).

Brace members 22, 23 and 24 are also provided for the strut members 18, 19 and 20. The configuration of these brace members 22, 23 and 24 is not critical, but they are very useful to connect the struts 18, 19 and 20 to the remainder of the fuselage 11 for added fuselage strength. Also, the supporting braces 22 and 23 can form all or part of the floor for the interior of the fuselage.

The tubular strut members 18, 19 and 20 are preferably formed of a very strong aluminum material. These strut members 18, 19 and 20 are preferably of a tubular configuration although they can be of other shapes. One advantage of the tubular configuration is the ease of construction, and also the fact that these struts can be sealed to provide floatation should the aircraft go down at sea. Also, a tubular configuration provides a great deal of strength with as little material and weight as possible. It is shown in FIG. 3 that the lower strut 19 is turned upwardly at the forward end thereof, and is attached to the top strut member 20 at the extreme tip thereof as indicated by joint 25. The other lower strut member 18 is essentially symmetrical with the strut member 19. The rear end of the lower strut members 18 and 19 turn upwardly and are spaced apart at the rear ends thereof adjacent the connection to the tail 13. Upper rear braces 26 connect the upper strut member 20 with the lower strut members 18 and 19 to make them rigid at the rear ends thereof (FIG. 4). Lower brace 27 connects the bottom strut members 18 and 19 together at the rear thereof. Since the cross-sectional shape of the fuselage is essentially the same at the point where the tail section connects with the strut members 18-20, as at the point shown in FIG. 2, it can be seen by reference to FIG. 4 that when an aircraft is landing with its nose slightly elevated as in a usual landing, that the skids 18 and 19 will tend to form two points of contact with the ground, or with the surface of the water upon which it is landing, to provide the stability needed to prevent it from turning to one side or the other and causing major damage. It is very important that the rear ends of the strut members 18 and 19 be spaced apart at the rear ends thereof, because if they were to converge and connect, the two point support would be destroyed. As it is now shown, even if the tail section 13 breaks off, the airplane can continue to have an otherwise smooth emergency landing.

The concave surface 21 is important, because it provides a higher degree of lift and control than conventional fuselage structures, at least at low speeds, and because the concave surface 21 is higher than the skids 18 and 19 and thereby does not tear away or in any way affect the two point contact of the skids 18 and 19. Furthermore, in a water emergency landing situation, the concave surface 21 tends to keep the aircraft above and skidding along the water to inhibit damage to the fuselage and to the remainder of the aircraft.

The wings 14 and 15 are designed to be relatively short so as to not tend to create movements about the center of the aircraft which would turn it to one side or the other. More importantly, the wings 14 and 15 are designed to be entirely and substantially above the strut members 18 and 19 so that the wings 14 and 15 will in no event hit the ground or water in an emergency landing situation so long as the pilot makes a landing with the wings in a substantially level and horizontal position.

Accordingly, it can be seen that the above preferred embodiment accomplishes the objects set forth above, and does indeed provide a safer aircraft than has existed heretofore. Obviously many modifications and variations of the present invention are possible in light of the above teachings. It is therefore to be understood, that, within the scope of the appended claims, the invention may be practiced otherwise than as specifically described.

I claim:
1. An airplane body comprising:
   a longitudinally extending fuselage, said fuselage being substantially concave along the bottom thereof;
   a first strut member attached to said fuselage along one side of said concave bottom and extending substantially from the front of said fuselage to a point forward of the rear end of said fuselage;
   a second strut member attached to said fuselage along the other side of said concave bottom and extending substantially from the front of said fuselage to a point substantially forwardly of the rear end of said fuselage, said first and second strut members having ends terminating substantially forwardly of the rear end of said fuselage and being spaced apart by a substantial distance at said terminating ends, whereby said first and second struts form skid means for emergency landing purposes;
   a pair of wings attached to said fuselage; and
   a tail attached to said fuselage rearwardly of the first and second strut members.
2. The airplane body of claim 1 wherein said first and second strut members are connected together at the forward ends thereof.
3. The airplane body of claim 1 wherein the lowermost portion of said wings is substantially above the bottom of the first and second strut members.
4. The airplane body of claim 1 wherein a third strut member is attached to the fuselage and extends along the longitudinal top thereof.
5. The airplane body of claim 4 wherein said third strut member connects with the first and second strut members at the forward ends thereof.
6. The airplane body of claim 1 wherein said first and second strut members extend upwardly at the forward end thereof.
7. The airplane body of claim 6 wherein said first and second strut members extend slightly upwardly at the rear ends thereof.
8. The airplane body of claim 4 wherein in lateral cross-section, the axes of said first, second and third strut members form the corners of an isosceles triangle.
9. The airplane body of claim 1 wherein said first and second strut members have a tubular configuration.
10. The airplane body of claim 4 wherein said third strut member has a tubular configuration.
11. The airplane body of claim 9 wherein said first and second strut members are sealed for floatation.
12. The airplane body of claim 1 wherein said first and second strut members are located substantially within said fuselage.

* * * * *